United States Patent [19]

Fernz

[11] Patent Number: 4,605,186

[45] Date of Patent: Aug. 12, 1986

[54] VIBRATION ISOLATION DEVICE USED WITH A JET ENGINE THRUST REVERSER UNIT

[75] Inventor: James A. Fernz, Wichita, Kans.

[73] Assignee: The Boeing Company, Seattle, Wash.

[21] Appl. No.: 580,796

[22] Filed: Feb. 16, 1984

[51] Int. Cl.⁴ ............................................. B64D 33/00
[52] U.S. Cl. ........................... 244/110 B; 239/265.39; 248/584; 248/596; 244/131
[58] Field of Search ..................... 244/110 B, 54, 131; 248/584, 592, 596, 598; 267/162; 60/226.2; 239/265.29, 265.31

[56] References Cited

U.S. PATENT DOCUMENTS

| 2,504,890 | 4/1950 | Sissor | 248/584 |
| 2,939,663 | 6/1960 | Suozzo | 267/162 |
| 3,262,271 | 7/1966 | Beavers | 60/226.2 |
| 3,460,762 | 8/1969 | Weise | 239/265.29 |

FOREIGN PATENT DOCUMENTS 180474  6/1922  United Kingdom ................ 248/596

Primary Examiner—Galen L. Barefoot
Attorney, Agent, or Firm—Edwin H. Crabtree

[57] ABSTRACT

A vibration isolation device connected to a drag arm of a blocker door assembly in a jet engine thrust reverser unit. The isolation device providing for preload, travel and vibration dampening of the drag arm on the blocker door assembly.

4 Claims, 4 Drawing Figures

2

VIBRATION ISOLATION DEVICE USED WITH A JET ENGINE THRUST REVERSER UNIT

BACKGROUND OF THE INVENTION

This invention relates to a vibration isolation device for thrust reverser units and more particularly, but not by way of limitation, to a vibration isolation device connected to a drag arm on a blocker door assembly used in a jet engine thrust reverser unit.

Heretofore, blocker door installations on jet engine thrust reverser engines have been found to fail in service because of excessive vibration and tension placed on the drag arm of the blocker door assembly.

In the following U. S. Pat. Nos. 3,691,771 to Colley, 4,216,926 to Lawson, 4,278,220 to Johnson et al, and 4,313,581 to Folmer et al, various types of thrust reverser sleeve and blocker door assemblies have been disclosed. None of the prior art patents address the problem of drag arm or drag link failure associated with a blocker door assembly used in a thrust reverser unit.

SUMMARY OF THE INVENTION

The subject vibration isolation device provides for preload, travel and vibration dampening of a drag arm or drag link used in connecting the mounting structure of the engine to a blocker door assembly used in a jet engine thrust reverser unit.

The vibration isolation device provides for easy adjustment, simplifies installation and service on the drag arm and blocker door assembly, and requires less space with reduced weight and reduced cost of installation and material.

Because of the features of the vibration isolation device a limited range of travel and adjustment is available in any given installation which heretofore was not available.

A pivot link which is part of the isolation device is spring-biased with a threaded bolt which makes installation and adjustment easily maintainable with conventional tools.

The vibration isolation device for connection to a mounting structure and a drag arm of a blocker door assembly used in a jet engine thrust reverser unit includes a fitting adapted for attachment to the mounting structure. The fitting includes a mounting bracket for pivotally mounting a pivot link thereon. The pivot link includes a tongue extending outwardly from one end which is spring-biased against the fitting. The other end of the pivot link is attached to the drag arm.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
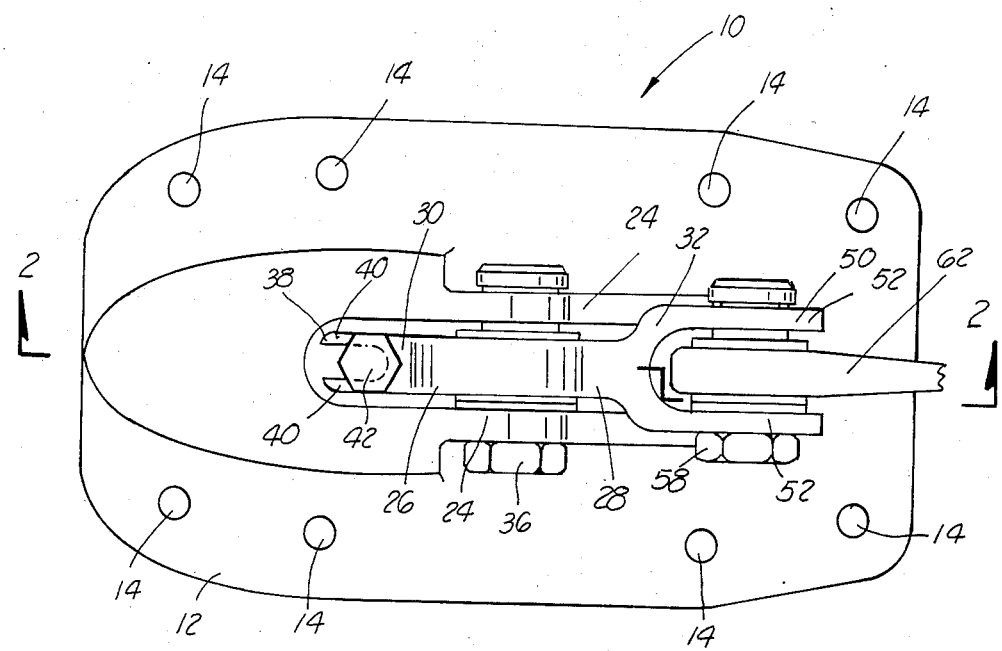
FIG. 1 is a top view of the vibration isolation device.

In FIG. 1 the vibration isolation device is designated by general reference numeral 10. The device 10 includes a fitting 12 having a plurality of apertures 14 used for receiving bolts which are not shown in the drawings and securing it to a mounting structure 16 shown in cross-section in FIGS. 2, 3 and 4.

Figure 2:
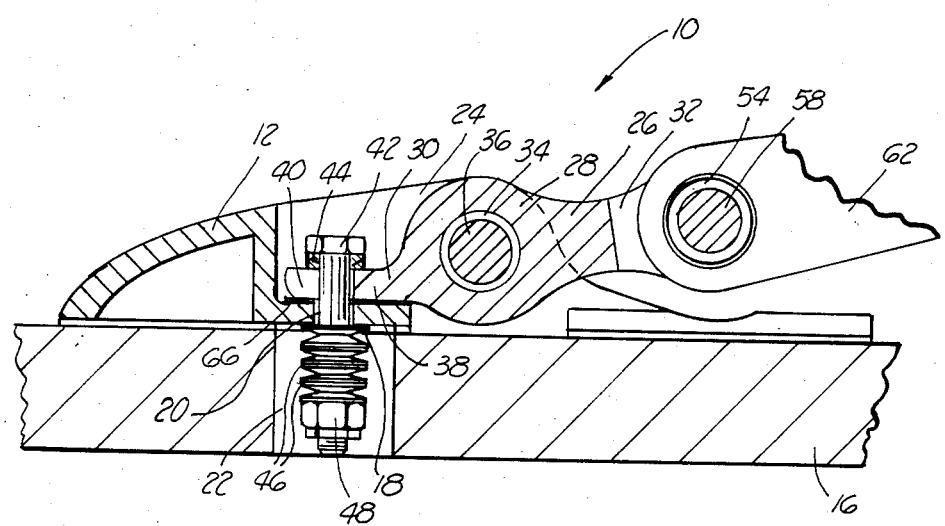
FIG. 2 illustrates a side sectional view of the isolation device in a fully extended position and taken along lines 2—2 shown in FIG. 1.

Referring now both to FIG. 1 and FIG. 2, the fitting 12 includes an aperture 18 with guide bushing 20 therethrough disposed adjacent an aperture 22 in the mounting structure 16. Adjacent the aperture 18 in the fitting 12 is a mounting bracket 24. The mounting bracket 24 is used for pivotally mounting a pivot link 26 having a center portion 28, a first end portion 30 and a second end portion 32. The center portion 28 of the pivot link 26 includes an aperture 34 for receiving a pivot bolt 36 therein and pivotally mounting the pivot link 26 on the fitting 12.

Extending outwardly from the first end portion 30 of the pivot link 26 is a tongue 38 having a pair of tongue arms 40 received around a spring-biased bolt 52. The bolt 42 includes a convex and concave washer 44 and a plurality of belleville washers 46 which are compressed between the bottom of the fitting 12 and a nut 48. By adjusting the nut 48 on the bolt 42, the pivot link 26 is preloaded to provide the proper vibration dampening effect required of the device 10. The convex and cancave washer 44 is self-aligning and is critical to a smooth operation. The washer maintains an in line load to prevent the bolt 42 from bending. The washer also presents a flat bearing surface to the head of the bolt 42 and tongue 38 to prevent galling during rotation of the pivot link 26.

The second end portion 32 includes a yoke 50 having a pair of yoke arms 52 with apertures 54 therein for receiving a drag arm bolt 58 which is used for pivotally mounting a drag arm 62 thereon. The drag arm 62 is connected to the blocker door assembly which is not shown in the drawings and is part of the overall structure of the thrust reverser unit.

In FIG. 2 the pivot link 26 connected to the drag arm 62 is shown with the drag arm 62 in an extended position with the tongue 38 engaging the top of a wear plate 66 mounted on top of the fitting 12 and surrounding the aperture 20 in the fitting 12. In this position the pivot link 26 limits the stroke of the drag arm 62.

Figure 3:
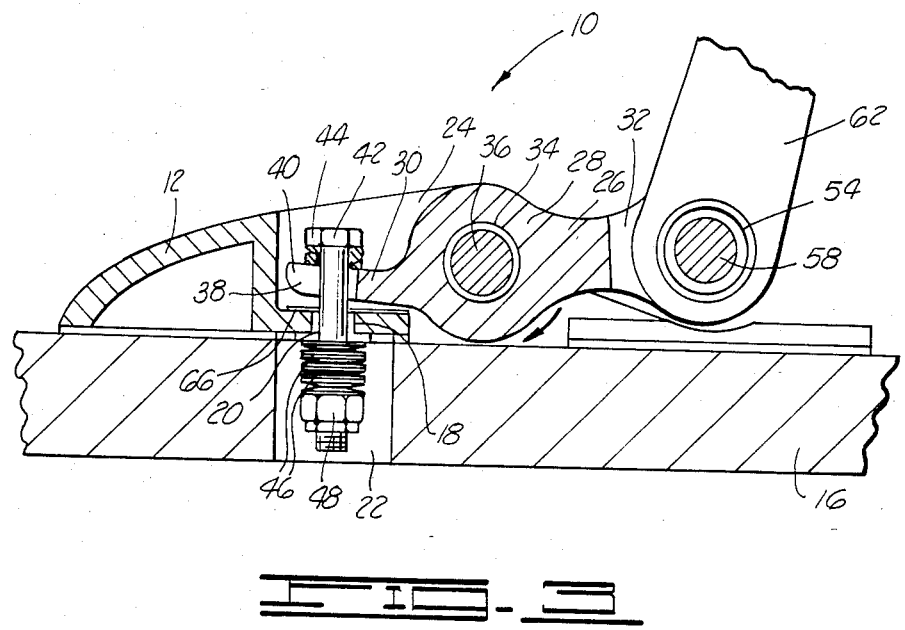
FIG. 3 is a side sectional view with the drag arm connected to the device in an over travel position.

In FIG. 3 the drag arm 62 is shown in an over travel position with the pivot link 26 rotated in a clockwise position on the pivot bolt 36 thereby raising the tongue 38 and engaging the top of the spring-biased bolt 42 compressing the belleville washers 46. In this position the pivot link 26 by its rotation compensates for the over travel of the drag arm 62 thereby increasing the compressive load on the spring-biased bolt 42 and the belleville washers 46.

Figure 4:
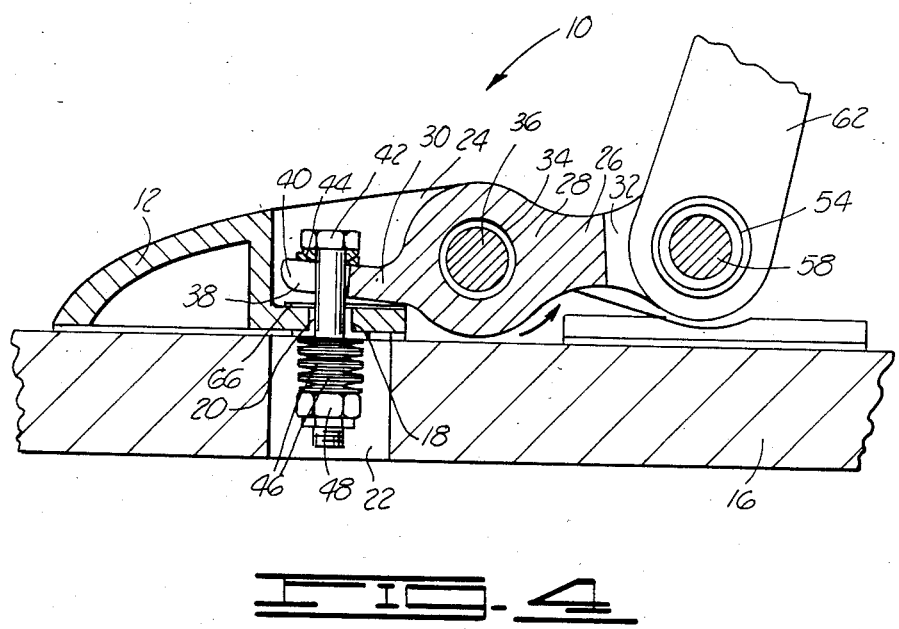
FIG. 4 is a side sectional view with the drag arm in a normal operating position.

In FIG. 4 the drag arm 62 is shown in a normal position with the pivot link 26 rotated in a counter clockwise direction relieving the compression on the belleville washers 46 with the pivot link 26 now in a normal preload position and within normal travel limits.

Through the use of the combination of the fitting 12, the pivot link 26, and the spring-biased bolt 42, the drag arm 62 is allowed to be placed in a fully extended position, normal operating position, and over travel position without increasing wear on the drag arm 62 and reducing the overall vibration placed on the blocker door assembly.

Changes may be made in the construction and arrangement of the parts or elements of the embodiments as described herein without departing from the spirit or scope of the invention defined in the following claims.

What is claimed is:

1. A vibration isolation device for connection to a mounting structure and a drag arm of a blocker door assembly used in a jet engine thrust reverser unit, the device comprising:
    a fitting adapted for attachment to the mounting structure, the fitting having an aperture with a guide bushing therein and a mounting bracket adjacent the aperture;
    a pivot link, pivotally mounted on the mounting bracket, one end of the link having a tongue connected to a spring-biased bolt, the bolt including a plurality of belleville washers and a threaded nut for adjusting the spring pressure to a pre-determined load when engaging the tongue of the pivot link, the bolt received in the aperture of the fitting, the other end of the pivot link pivotally attached to the drag arm; and
    a wear plate mounted on top of the fitting and adjacent the tongue of the pivot link for engaging the bottom of the tongue when the link is rotated in counterclockwise direction thereon, the drag arm, when moved from a normal operating position to an over-extended position rotates the pivot link in the counterclockwise position raising the tongue above the wear plate and compressing the belleville washers.

2. The device as described in claim 1 wherein the pivot link is pivotally mounted on the bracket by a pivot bolt.

3. The device as described in claim 1 wherein the drag arm is pivotally attached to the pivot link by a drag arm bolt.

4. A vibration isolation device for connection to a mounting structure and to a drag arm of blocker door assembly used in a jet engine thrust reverser unit, the device comprising:
    a fitting adapted for attachment to the mounting structure, the fitting having an aperture with guide bushing therein and a mounting bracket having a plurality of apertures through the mounting bracket and adjacent the aperture;
    a pivot link having a center portion with an aperture therethrough, a first end portion and a second end portion, the first end portion including a "U" shaped tongue extending outwardly therefrom, the tongue having a pair of tongue arms received around a spring-biased bolt, the bolt including a plurality of belleville washers and a threaded nut for adjusting the spring pressure to a pre-determined load when engaging the tongue of the pivot link, the bolt received through the aperture in the fitting, the aperture in the center portion of the pivot link and the apertures in the mounting bracket receiving a pivot bolt therethrough for pivotally mounting the pivot link on the fitting, the second end portion of the pivot link including a "U" shaped yoke having a pair of yoke arms with apertures therethrough, the apertures in the yoke arm receiving a drag arm bol therethrough and adapted for engaging and pivotally mounting the drag arm thereon; and
    a wear plate mounted on top of the fitting and adjacent the "U" shaped tongue of the pivot link for engaging the bottom of the tongue when the link is rotated in a clockwise direction thereon, the drag arm when moved from a normal operating position to an overextended position rotates the pivot link in a counterclockwise position raising the tongue above the wear plate and compressing the belleville washers.

* * * * *